(12) United States Patent
Agnihotri et al.

(10) Patent No.: US 9,798,036 B2
(45) Date of Patent: Oct. 24, 2017

(54) CORKSCREW EFFECT REDUCTION ON BOREHOLE INDUCTION MEASUREMENTS

(71) Applicant: Halliburton Energy Services, Inc., Houston, TX (US)

(72) Inventors: Ameet B. Agnihotri, Cypress, TX (US); Junsheng Hou, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/039,953

(22) PCT Filed: Jan. 20, 2016

(86) PCT No.: PCT/US2016/013993
§ 371 (c)(1),
(2) Date: May 27, 2016

(87) PCT Pub. No.: WO2016/118549
PCT Pub. Date: Jul. 28, 2016

(65) Prior Publication Data
US 2017/0003414 A1    Jan. 5, 2017

Related U.S. Application Data
(60) Provisional application No. 62/107,054, filed on Jan. 23, 2015.

(51) Int. Cl.
*G01V 3/38*    (2006.01)
*G01V 3/28*    (2006.01)
(52) U.S. Cl.
CPC . *G01V 3/38* (2013.01); *G01V 3/28* (2013.01)

(58) Field of Classification Search
CPC ....................................................... G01V 3/38
See application file for complete search history.

(56) References Cited

U.S. PATENT DOCUMENTS

| 5,041,975 A * | 8/1991 | Minerbo | G01V 3/38 |
| | | | 702/7 |
| 5,900,733 A * | 5/1999 | Wu | G01V 3/30 |
| | | | 324/338 |

(Continued)

FOREIGN PATENT DOCUMENTS

EP    22704201 A1    1/2011

OTHER PUBLICATIONS

"International Application Serial No. PCT/US2016/013993, International Search Report dated May 3, 2016", 4 pgs.

(Continued)

*Primary Examiner* — Manuel L Barbee
*Assistant Examiner* — Raymond Nimox

(57) ABSTRACT

In some embodiments, a multi-array induction method uses user selectable zoning of a borehole to generate an updated look-up table for borehole corrections based on averaged calipers for the borehole. One example method averages caliper data, defines a good zone of the borehole substantially unaffected by corkscrew borehole effect, defines a start depth and an end depth of a zone of the borehole affected by the corkscrew borehole effect, and averages the caliper data for each coil array to generate updated resistivity outputs $R_O$, $R_t$, and $R_f$ for further drilling of the borehole.

21 Claims, 15 Drawing Sheets

(56) References Cited

U.S. PATENT DOCUMENTS

| | | | |
|---|---|---|---|
| 6,384,605 B1 * | 5/2002 | Li | G01V 3/30 324/338 |
| 2003/0141112 A1 | 7/2003 | Hinds | |
| 2005/0256642 A1 * | 11/2005 | Barber | G01V 3/38 702/6 |
| 2005/0256644 A1 * | 11/2005 | Xiao | G01V 3/28 702/7 |
| 2006/0106541 A1 * | 5/2006 | Hassan | G01V 1/48 702/6 |
| 2006/0155471 A1 * | 7/2006 | Tabarovsky | G01V 3/38 702/6 |
| 2007/0068706 A1 | 3/2007 | Harleman | |
| 2007/0234787 A1 * | 10/2007 | Rabinovich | G01V 3/28 73/152.02 |
| 2008/0030196 A1 * | 2/2008 | Bespalov | G01V 3/28 324/339 |
| 2008/0033654 A1 * | 2/2008 | Bespalov | G01V 3/28 702/7 |
| 2008/0315883 A1 * | 12/2008 | Chemali | G01V 3/28 324/339 |
| 2009/0145610 A1 | 6/2009 | Varkey et al. | |
| 2010/0057365 A1 * | 3/2010 | Merchant | G01V 3/28 702/7 |
| 2010/0109672 A1 * | 5/2010 | Rabinovich | G01V 3/28 324/338 |
| 2010/0179762 A1 * | 7/2010 | Tabarovsky | G01V 3/28 702/7 |
| 2014/0286538 A1 | 9/2014 | Yu et al. | |

OTHER PUBLICATIONS

"International Application Serial No. PCT/US2016/013993, Written Opinion dated May 3, 2016", 6 pgs.

* cited by examiner

CORKSCREW EFFECT REDUCTION ON BOREHOLE INDUCTION MEASUREMENTS

PRIORITY APPLICATION

This application is a U.S. National Stage Filing under 35 U.S.C. 371 from International Application No. PCT/US2016/013993, filed on 20 Jan. 2016, which claims the benefit of U.S. Provisional Application Ser. No. 62/107,054, filed on Jan. 23, 2015, which applications are incorporated by reference herein in there entirety.

BACKGROUND

In directional drilling, the angle of the bottom hole assembly (BHA) is typically fixed on the surface before lowering the BHA down hole. The borehole drilling operation may then be performed by circulating fluid (mud) through the drill pipe which in turn rotates the mud motor and, thus, the drill bit.

As the drilling process continues, an operation typically referred to as sliding may occur where the rotating drill bit is being pushed with the drill string while the fixed angle at the motor assembly keeps increasing the angle. Excessive build up of the angle is controlled by what is known as "rotating and sliding". The "rotating and sliding" operation constitutes rotating the drill pipe from a rotary table at the surface while simultaneously pumping the mud through the drill pipe to rotate the mud motor. This "rotating and sliding" operation results in a corkscrew effect such as a "spiral borehole" or "corkscrew borehole". The resulting corkscrew effect in the borehole may reduce the accuracy of downhole measurements.

DETAILED DESCRIPTION

Some of the challenges noted above, as well as others, may be addressed by using a borehole corkscrew effect reduction on downhole measurements. By averaging caliper data, defining a zone of the borehole substantially unaffected by corkscrew borehole effect and a zone affected by the corkscrew effect, then averaging the caliper data for each tool coil array, updated resistivity logs for difference resolution outputs (e.g., one foot ($R_O$), two foot ($R_t$), four foot ($R_f$)) may then be generated for further drilling of the borehole.

Figure 1:
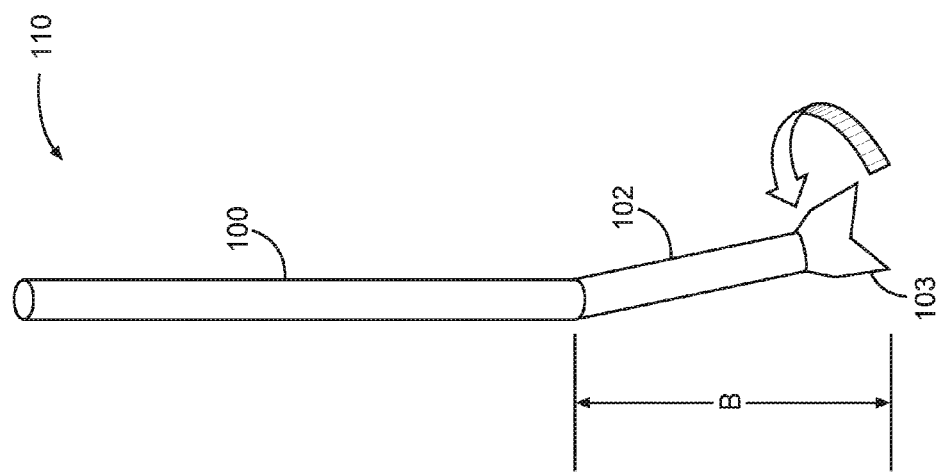
FIG. 1 is a diagram showing a BHA with a fixed angle at the drill bit and rotating drill bit, according to various embodiments.

FIG. 1 is a diagram showing a BHA 110 with a fixed angle at the drill bit 103 and rotating drill bit 103, according to various embodiments. The BHA 110 includes the drill pipe 100 coupled to an extension 102 that is coupled to the drill bit 103. Prior to lowering the BHA 110 into the borehole, the angle between the drill bit 103/extension 102 and the drill pipe 100 is set at the surface.

A pitch of the corkscrew effect (see FIG. 4) depends upon the length "B". In an embodiment, B may be 4 feet. Other embodiments may vary this length for different measure while drilling (MWD) operations. In the embodiment of FIG. 1, only the drill bit 103 is shown to be rotating in response to the rotation of the mud motor.

Figure 2:
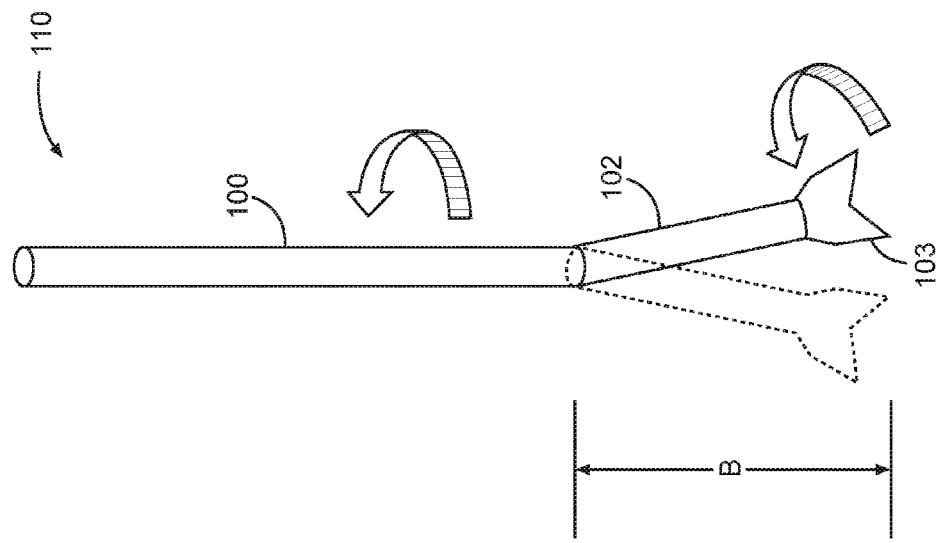
FIG. 2 is a diagram showing a BHA with a fixed angle at the drill bit and BHA rotating simultaneously with the rotating drill bit, according to various embodiments.

FIG. 2 is a diagram showing the BHA 110 with a fixed angle at the drill bit 103 and BHA 110 rotating simultaneously with the rotating drill bit 103, according to various embodiments. The simultaneous rotation of the drill pipe 100 (e.g., by the rotary table on surface) with the drill bit (e.g., rotated by mud motor) as the BHA 110 drills through the geological formation may result in the corkscrew effect in the borehole. The corkscrew effect may occur only in certain zones of the borehole and not all through the well.

Figure 3:
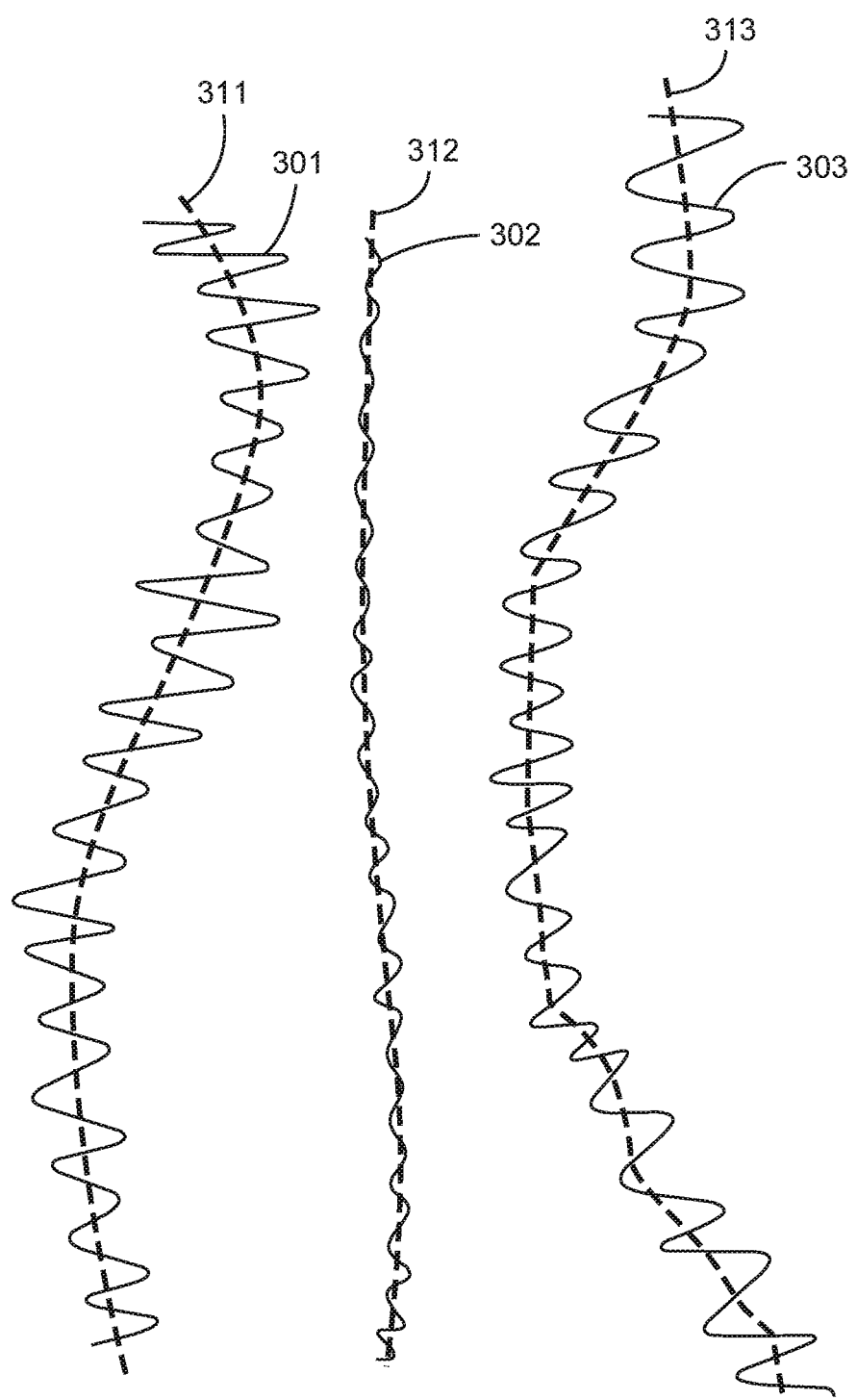
FIG. 3 is a diagram showing a corkscrew borehole oscillating caliper log profile, according to various embodiments.

FIG. 3 is a diagram showing a corkscrew borehole oscillating caliper profile, according to various embodiments. This diagram shows the caliper oscillations 301-303 that occur from the corkscrew effect in the borehole. As known in the art, caliper data provides a representation of the measured diameter of a borehole along its depth. Caliper logs may be measured mechanically or sonically. The figure also shows the averaged caliper data 311-313 as will be discussed subsequently.

Figure 4:
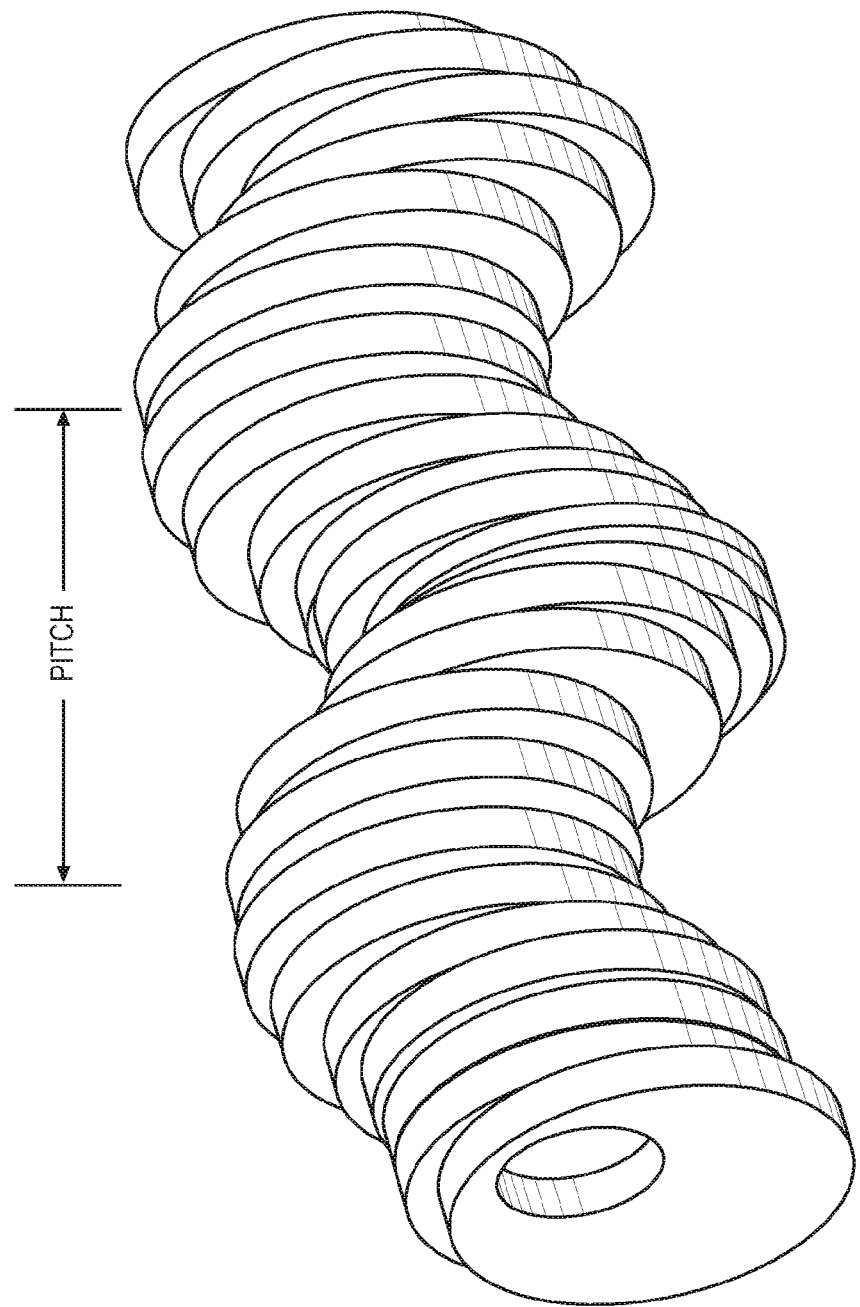
FIG. 4 is a diagram showing a corkscrew borehole profile with resulting pitch, according to various embodiments.

FIG. 4 is a diagram showing a corkscrew borehole profile with resulting pitch, according to various embodiments. As discussed previously, this pitch is set by the length "B" on the BHA 110. For example, if "B" is four feet, the resulting corkscrew effect pitch would be four feet as well.

An induction tool used to perform downhole measurements may include a bucking coil whose function is to reduce the directly coupled signal in the receiver coils caused by proximity and orientation on the tool with the transmitter. The bucking coil is wound with a different polarity than the other receiver coils to produce such an effect.

The negative conductivity signal from the bucking coil changes in magnitude due to the fluctuating borehole size due to the corkscrew effect. The change in magnitude of the signal is a result of the changes in the amount of conductive borehole fluid around the tool. This changing magnitude of the bucking coil signal (e.g., negative signal) sets up an a cyclic pattern of highs and lows in an effective conductivity signal.

Figure 5:
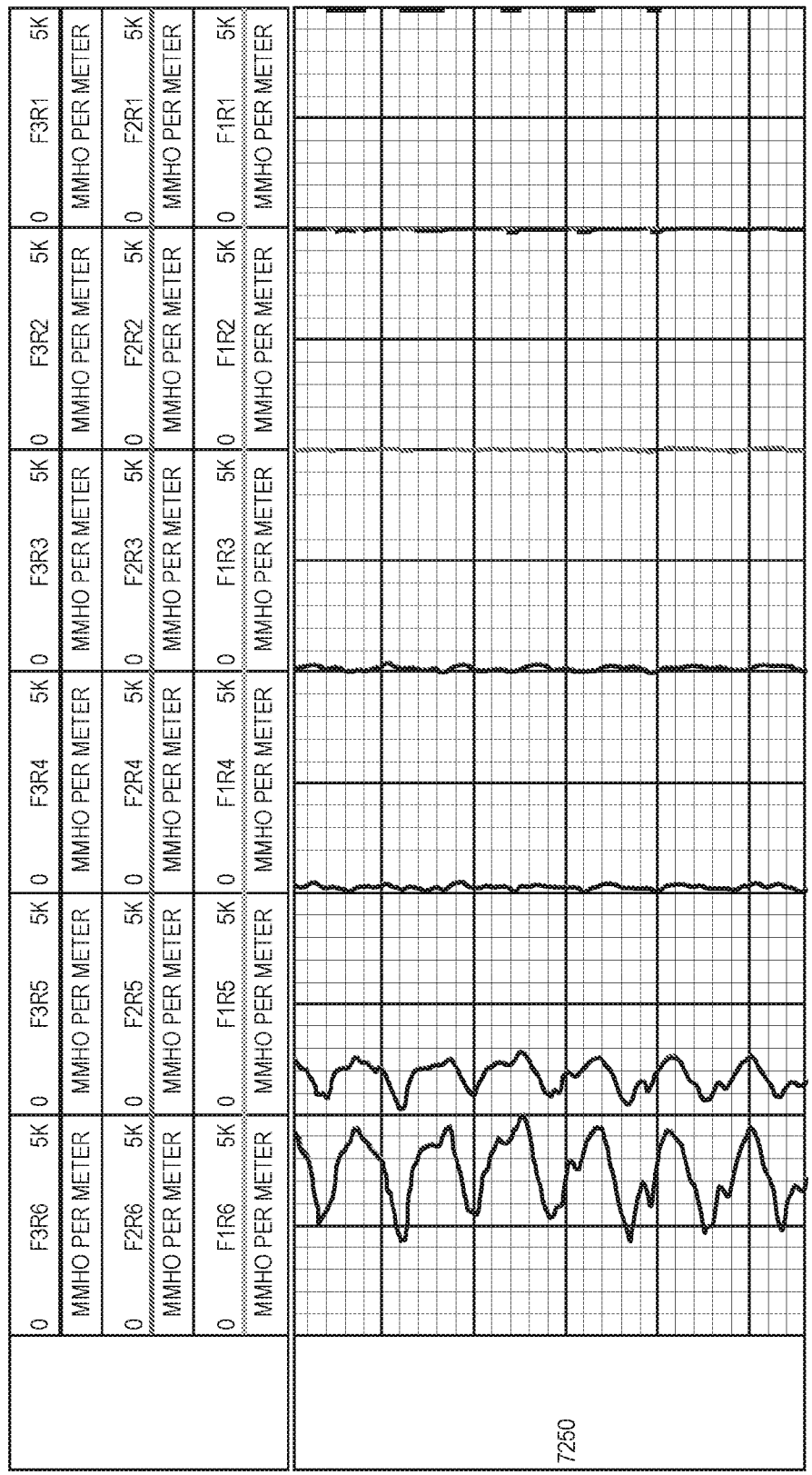
FIG. 5 is a plot showing oscillations of a positive effective conductivity signal due to corkscrew borehole, according to various embodiments.
Figure 6:
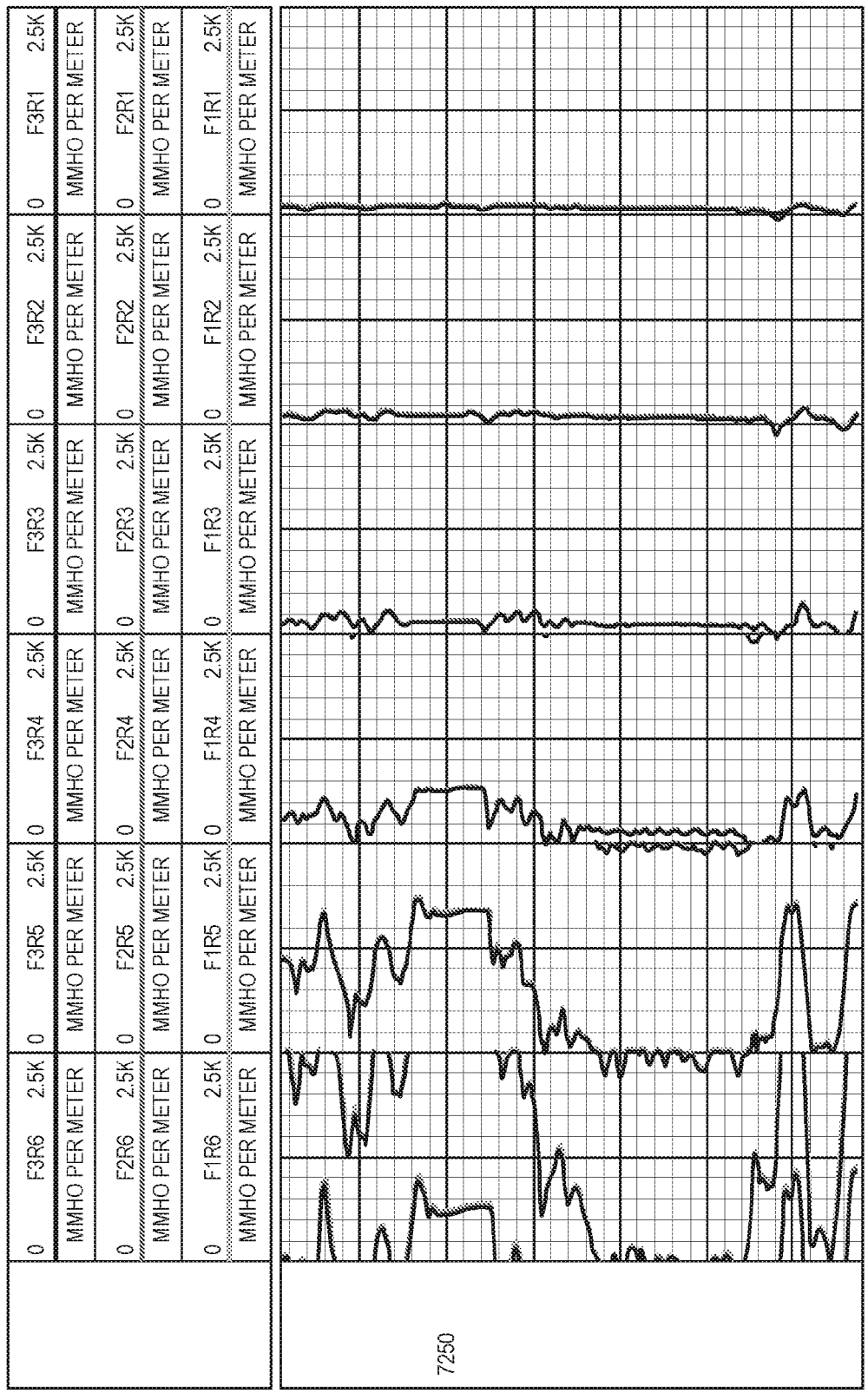
FIG. 6 is a plot showing ripples and oscillations in a negative effective conductivity signal, according to various embodiments.

FIG. 5 is a plot showing oscillations of a positive effective conductivity signal due to corkscrew borehole, according to various embodiments. There are several cases where the effective conductivity signal is positive but it is oscillating due to corkscrew effect in the borehole, as illustrated in FIG. 5. FIG. 6 is a plot showing ripples and oscillations in a negative effective conductivity signal, according to various embodiments.

Induction data measured by the induction tool undergoes skin effect correction and borehole correction. The skin effect correction may be defined as the penetration of a conductor by an electromagnetic (EM) wave. The E-field decays as it travels into the medium. The induced current density is proportional to the E-field and directed perpendicularly to the wave motion. The induced currents lead to Ohmic losses. The skin effect depth is the characteristic exponential decay length of the electric field.

The borehole correction may be defined as the amount by which a log measurement is adjusted in order to remove the contribution of the borehole. Although most log measurements are designed to pick up a minimum of signal from the borehole, some contribution usually remains. This contribution may be removed in the log data by replacing the borehole with a resistivity equal to that of the formation.

The data from particular coils of the induction tool may be used for the borehole corrections. If oscillations are present on raw signals from the particular coil arrays, these oscillations will ultimately manifest themselves in the final output as well.

The extent to which the corkscrew effect will be evident in the final output is also dependent upon the two foot resolution resistivity log data ($R_t$) of the formations. This may be an indication of: the amount of conductivity signal present in longer arrays before that signal experienced borehole correction, the resistivity of the mud ($R_m$), the borehole size, and the pitch of the corkscrew effect in the borehole.

Figure 7:
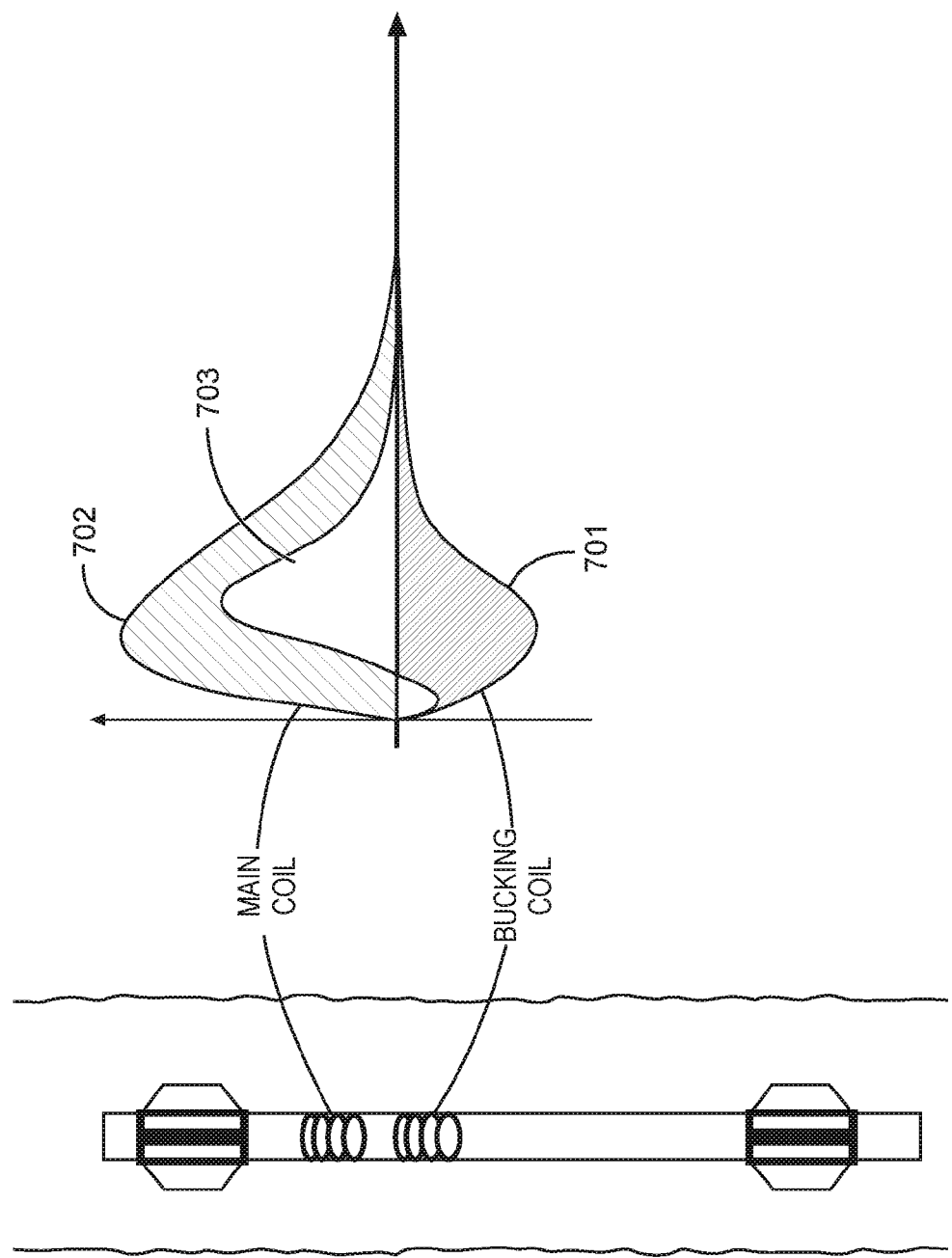
FIG. 7 is a diagram showing effect of corkscrew borehole on signal from array induction tool—good borehole condition, according to various embodiments.

FIG. 7 is a diagram showing effect of corkscrew borehole on signal from array induction tool—good borehole condition, according to various embodiments. This plot shows the signal 702 from the main receiver coil, the signal 701 from the bucking coil, and the resulting effective receiver signal 703 resulting from the combination of the other two signals 701, 702.

Figure 8:
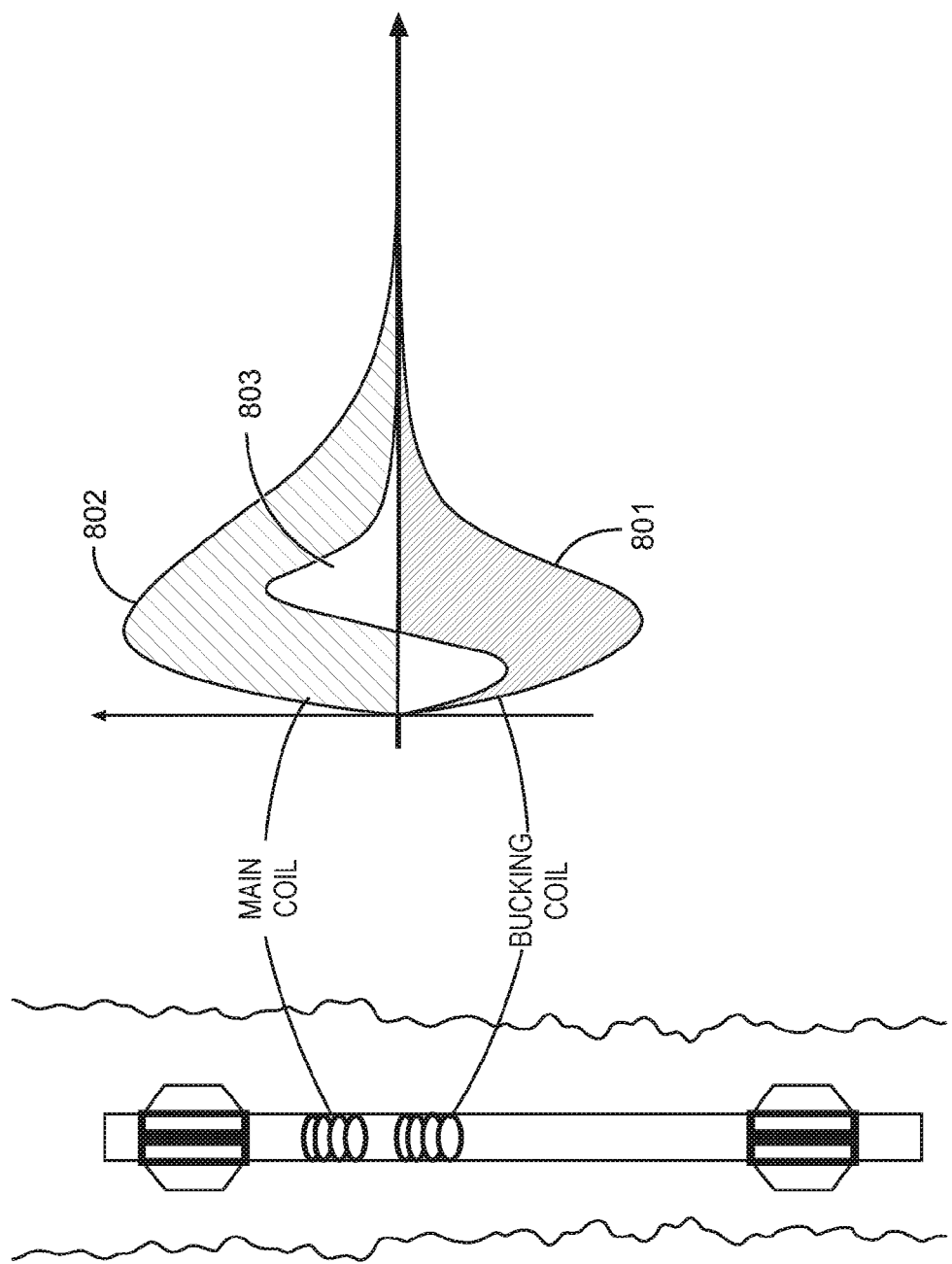
FIG. 8 is a diagram showing effect of corkscrew borehole on signal from array induction tool borehole—with corkscrew condition, according to various embodiments.

FIG. 8 is a diagram showing effect of corkscrew borehole on signal from array induction tool borehole—with corkscrew effect, according to various embodiments. This plot shows the signal 802 from the main receiver coil, the signal 801 from the bucking coil, and the resulting effective receiver signal 803 resulting from the combination of the other two signals 701, 702.

Comparing the signals from the plot of FIG. 7 to the plot of FIG. 8, it can be seen that while the main receiver coil signals 702, 802 are substantially similar, the bucking coil signal 801 in the borehole with the corkscrew effect is larger. Thus, the effective receiver signal 803 of the borehole with the corkscrew effect is smaller when compared to the effective signal 803 of the borehole without the corkscrew effect.

Figure 9:
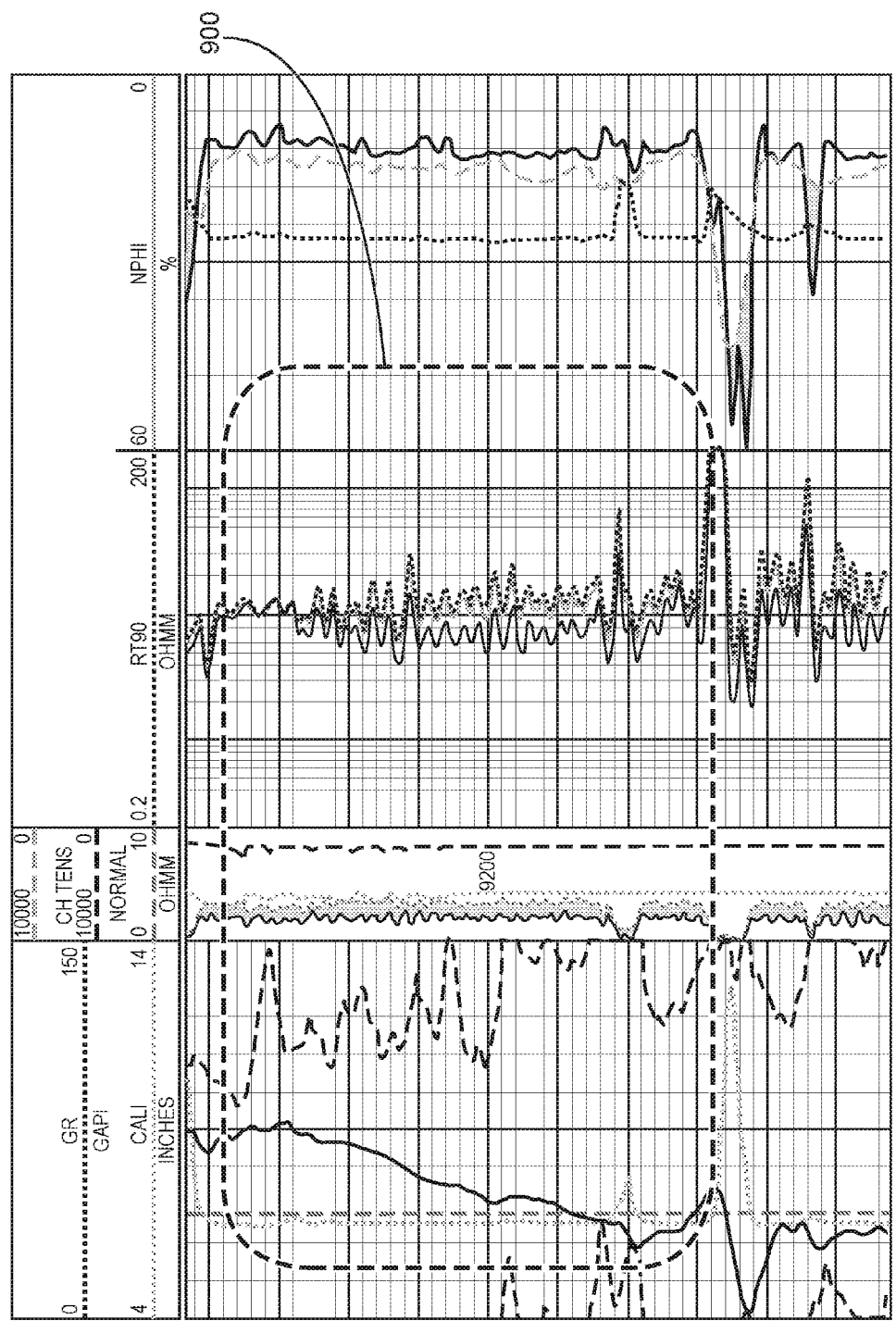
FIGS. 9 and 10 are plots showing effect of corkscrew borehole on array induction log, according to various embodiments.
Figure 10:
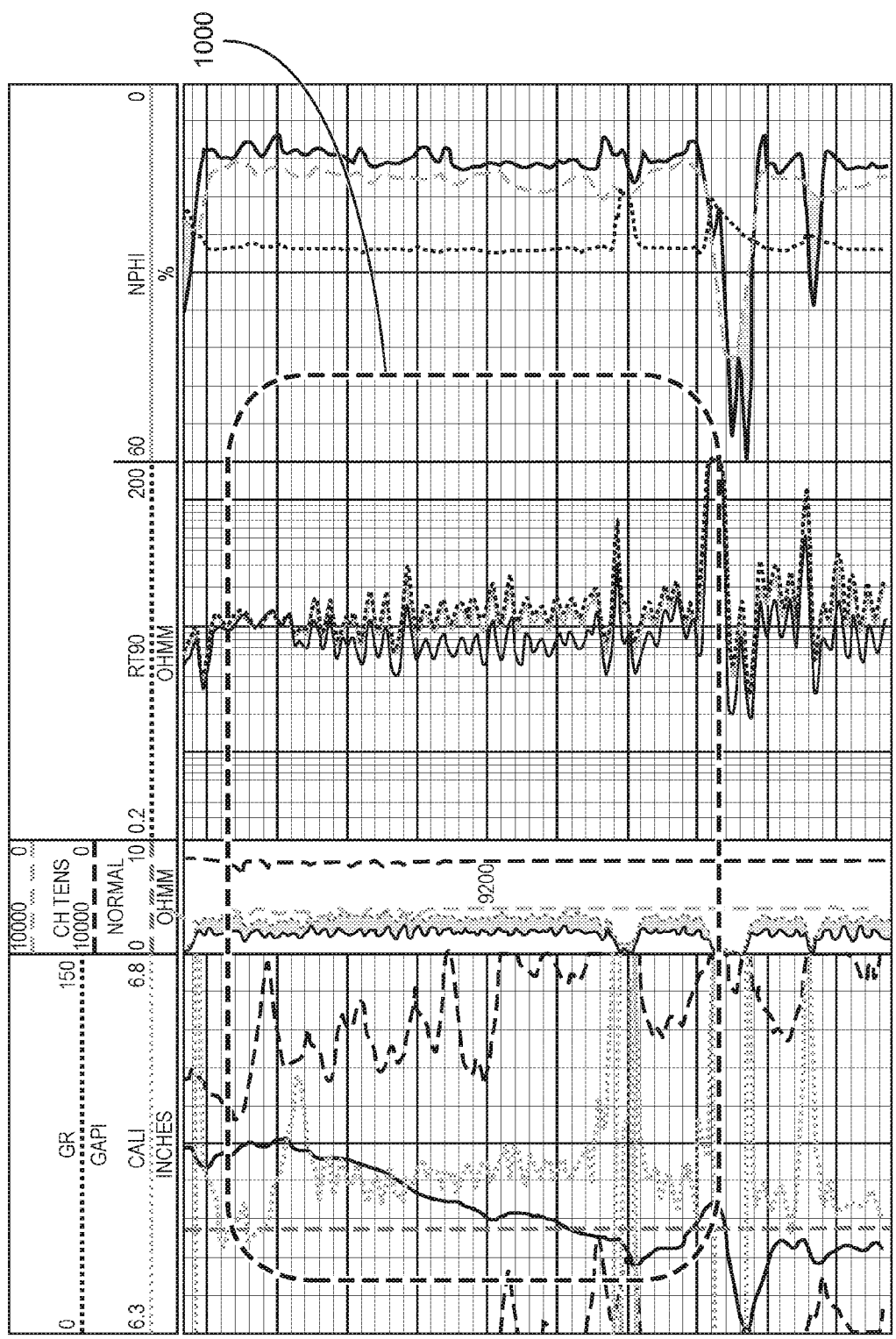

FIG. 9 is a plot showing effect of corkscrew borehole on array induction log, according to various embodiments. FIG. 10 is a plot showing effect of corkscrew borehole on array induction log, according to various embodiments. The effect on the log may be apparent on the resistivity data from the array induction tool as shown in areas 900 and 1000. The intensity of the corkscrew effect may depend upon the diameter of the hole, mud salinity, pitch of the corkscrew, and formation resistivity.

Figure 11:
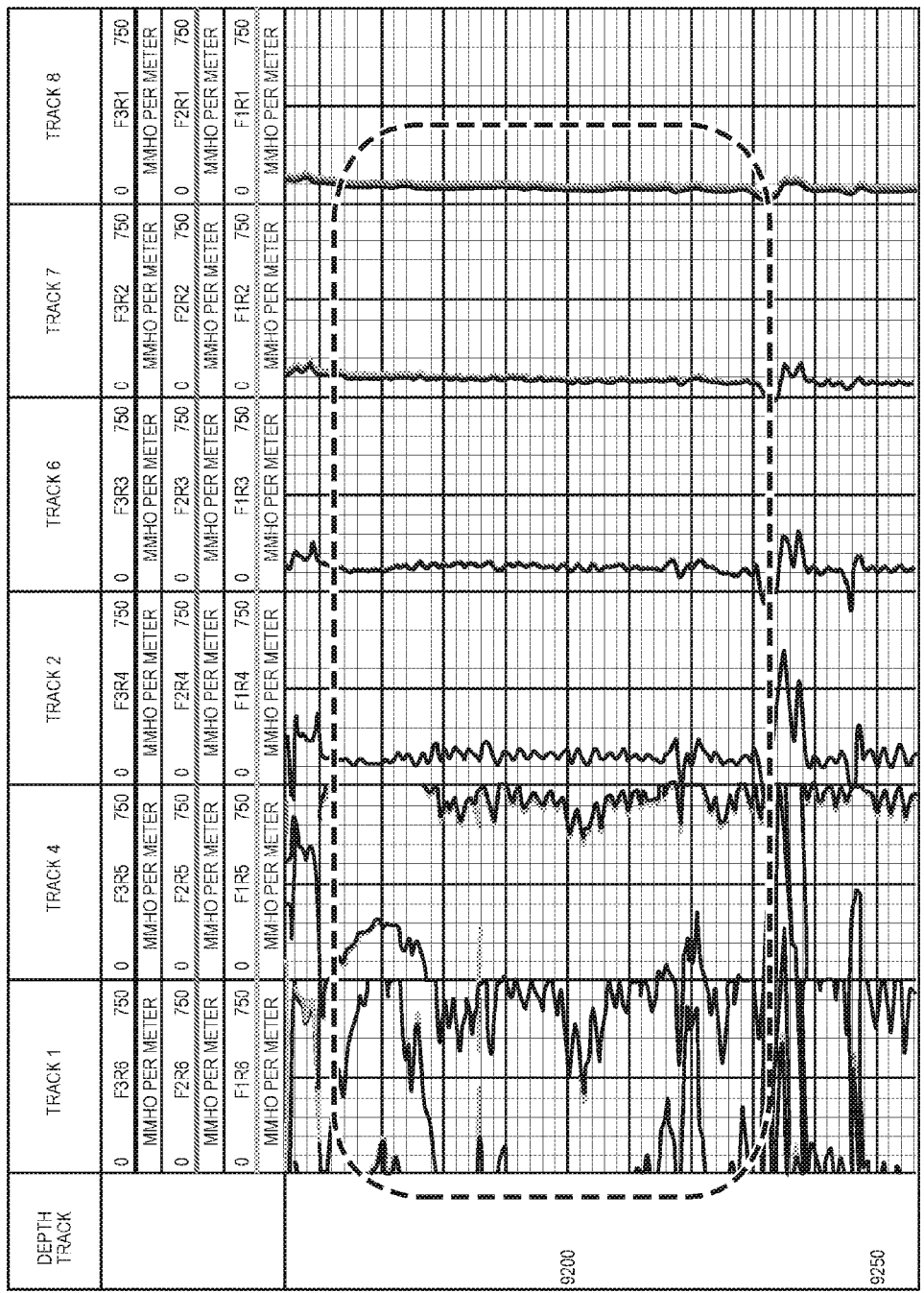
FIGS. 11 and 12 are plots showing raw coil signals from individual arrays, according to various embodiments.
Figure 12:
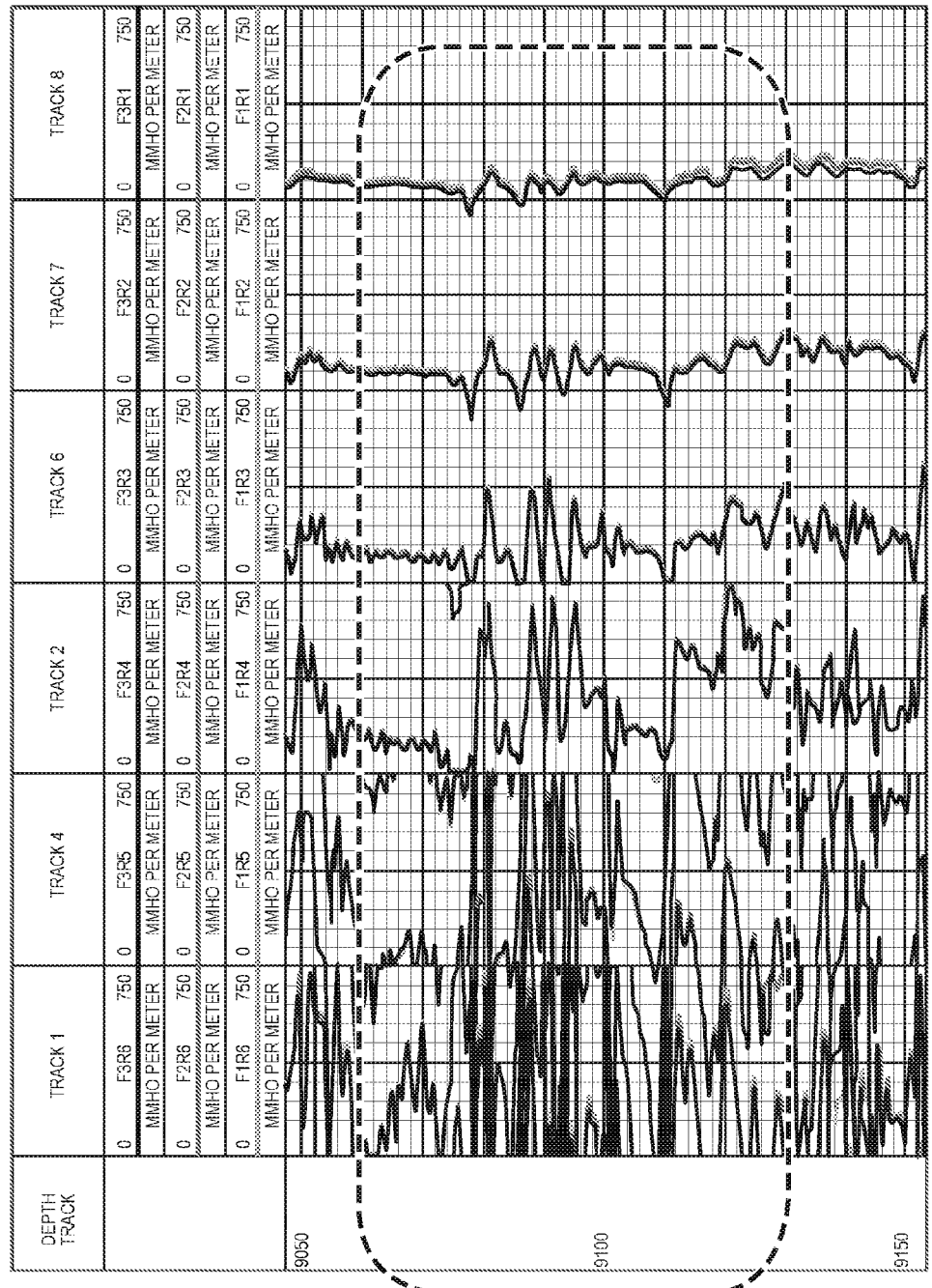

The corkscrew borehole effect is normally more visible on 6", 10" and 17" coil arrays, as shown in FIGS. 11 and 12. FIGS. 11 and 12 are plots showing raw coil signals from individual arrays, according to various embodiments.

Analyzing the extent of the corkscrew effect is a first part in reducing the corkscrew effect on the log data. As shown in FIGS. 11 and 12, the plots are from the same well within 200 feet of each other. As one can see, the plot of FIG. 11 shows a more severe situation than the plot of FIG. 12. Thus, the corkscrew effect may vary within the same well. According to aspects of the present invention, a scheme has been determined to reduce the effect of the corkscrew effect in a borehole on resistivity data from an array induction tool.

Figure 13:
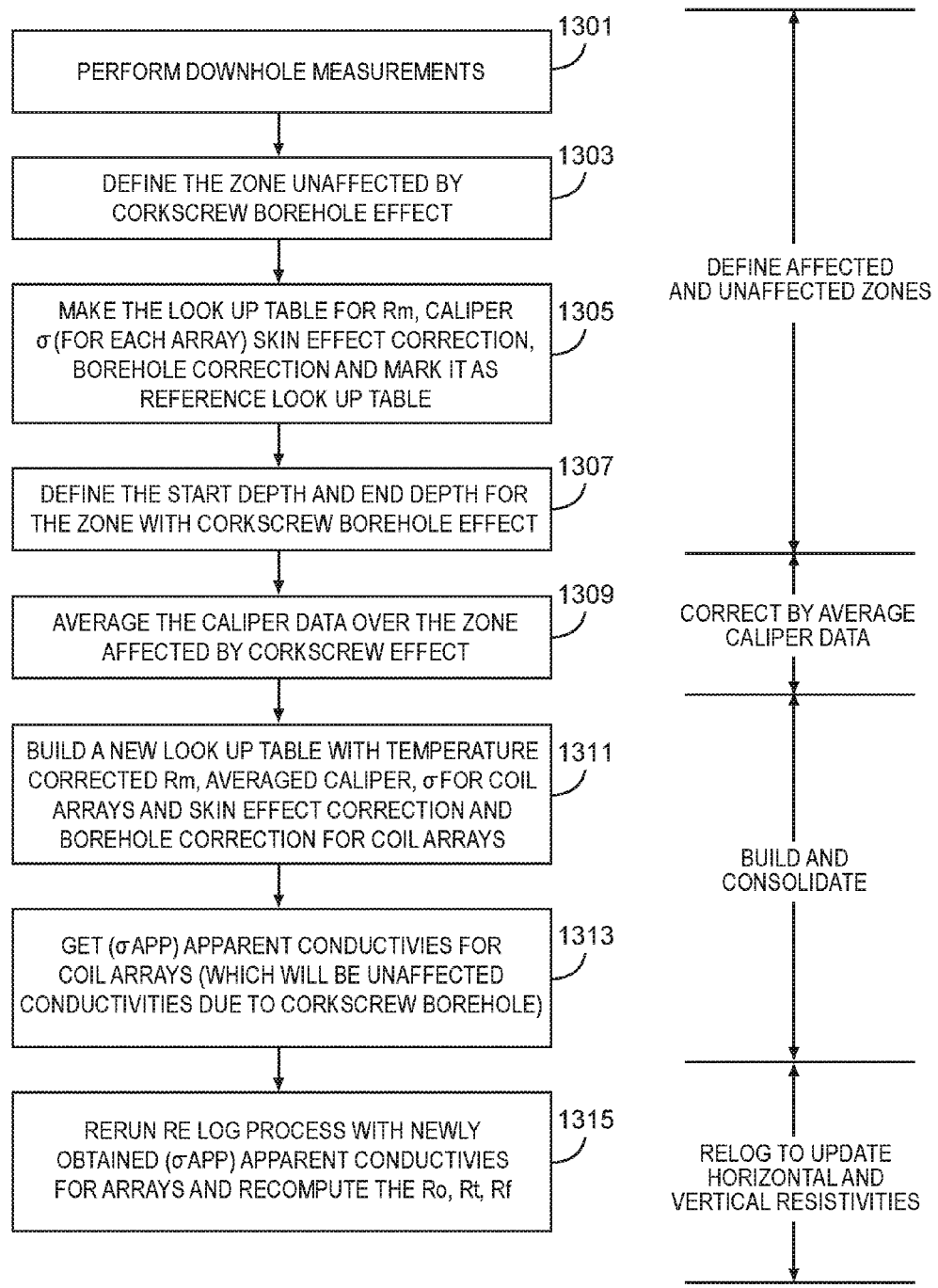
FIG. 13 is a flowchart showing an example method for borehole corkscrew effect reduction on array induction measurements, according to various embodiments.

FIG. 13 is a flowchart showing an example method for borehole corkscrew effect reduction on array induction measurements, according to various embodiments. In block 1301, downhole measurements are performed. These measurements may include geological formation resistivities (e.g., horizontal, vertical) as measured by a multi-array induction sensor tool. The measurements may also include measurement of the caliper data as performed by a mechanical or sonic tool.

In block 1303, an unaffected zone is defined in the borehole that is unaffected by the corkscrew effect. This may be determined by analysis of the caliper data.

In block 1305, a referenced look-up table is generated that comprises the mud resistivity ($R_m$), the measured caliper data, conductivity ($\sigma$), skin effect correction, and borehole correction. In an embodiment, this reference table may be generated for each array of the sensor tool.

In block 1307, an affected zone is defined in the borehole that is affected by the corkscrew effect. The caliper data may be used to define both the start depth and the stop depth of the zone. Thus, blocks 1301-1307 define the affected and unaffected zones of the borehole. In an embodiment, this may be accomplished by using raw coil signals from deeper arrays such as 50" and 80" raw coil signal conductivity $\sigma$.

In block 1309, the caliper data is averaged over the affected zone between the start and stop depths of the borehole. This averaging can then be used as corrected or updated borehole caliper data.

Blocks 1311 and 1313 build temperature corrected look-up tables using the reference look-up table. In block 1311, a new, temperature corrected lookup table is generated. In an embodiment, this table is generated for each array and comprises $R_m$, averaged caliper data, $\sigma$ (e.g., from 29", 50" and 80" coils), skin effect correction, borehole correction, and the apparent conductivity ($\sigma_{app}$) for 6", 10", and 17" arrays from the reference look up table. In block 1313, the apparent conductivities for the coil arrays (e.g., 6", 10", 17") are determined. These conductivities are unaffected conductivities from the corkscrew effect.

A re-logging step may then be accomplished to update the previously measured resistivities based on the averaged caliper data. In block 1315, the temperature compensated look-up table comprising the apparent conductivities (e.g., based on the averaged caliper data), $R_m$, averaged caliper data, skin effect correction, and borehole correction, is used to update $R_O$, $R_t$, $R_f$ outputs by a re-log process.

Figure 14:
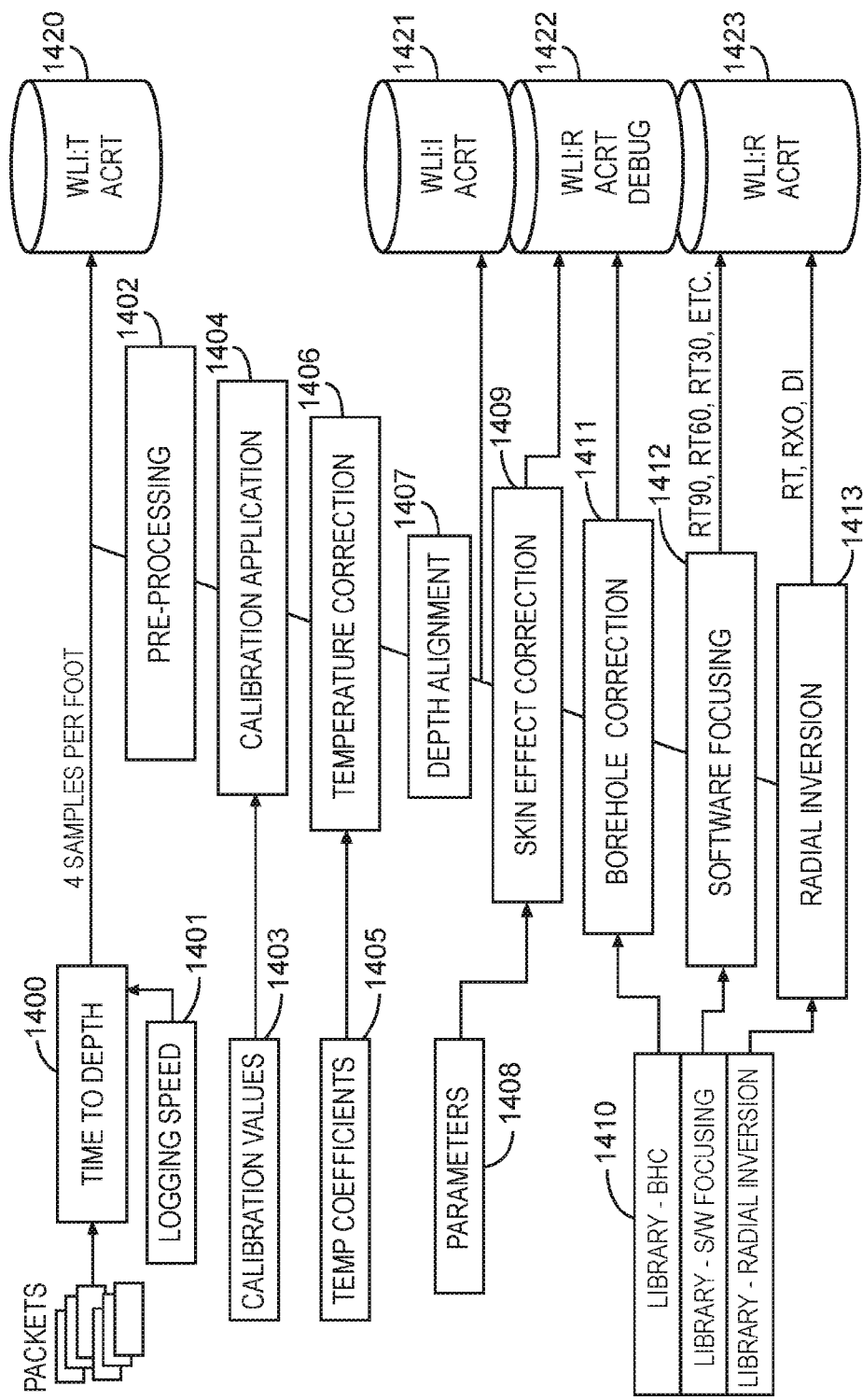
FIG. 14 is a diagram showing array induction data processing, according to various embodiments.

FIG. 14 is a diagram showing array induction data processing, according to various embodiments. The method for borehole corkscrew effect reduction of FIG. 13 may be incorporated into this workflow.

Conventional schemes were based upon simple filtering the data. This new scheme is based upon multi-array induction theory, user selectable zoning of the borehole, and use of existing algorithm to build a new library for borehole corrections using averaged caliper data.

A time to reach a predetermined depth 1400 in a borehole, using an input logging speed 1401. Calibration values for caliper data are determined in response to the average caliper data 1403. Pre-processing 1402 may also be performed on the calibration values.

Temperature coefficients are determined 1405 in order to perform temperature correction 1406 of the measured data. Depth alignment 1407 of the tool may also be performed.

Skin effect correction 1409 may be performed on the data using skin effect parameters 1408. A library of borehole corrected (BHC) data 1410 may be input to borehole correction 1411, software focusing 1412, and radial inversion 1413 processes. All of the above processes may store data in various databases 1420-1423.

Figure 15:
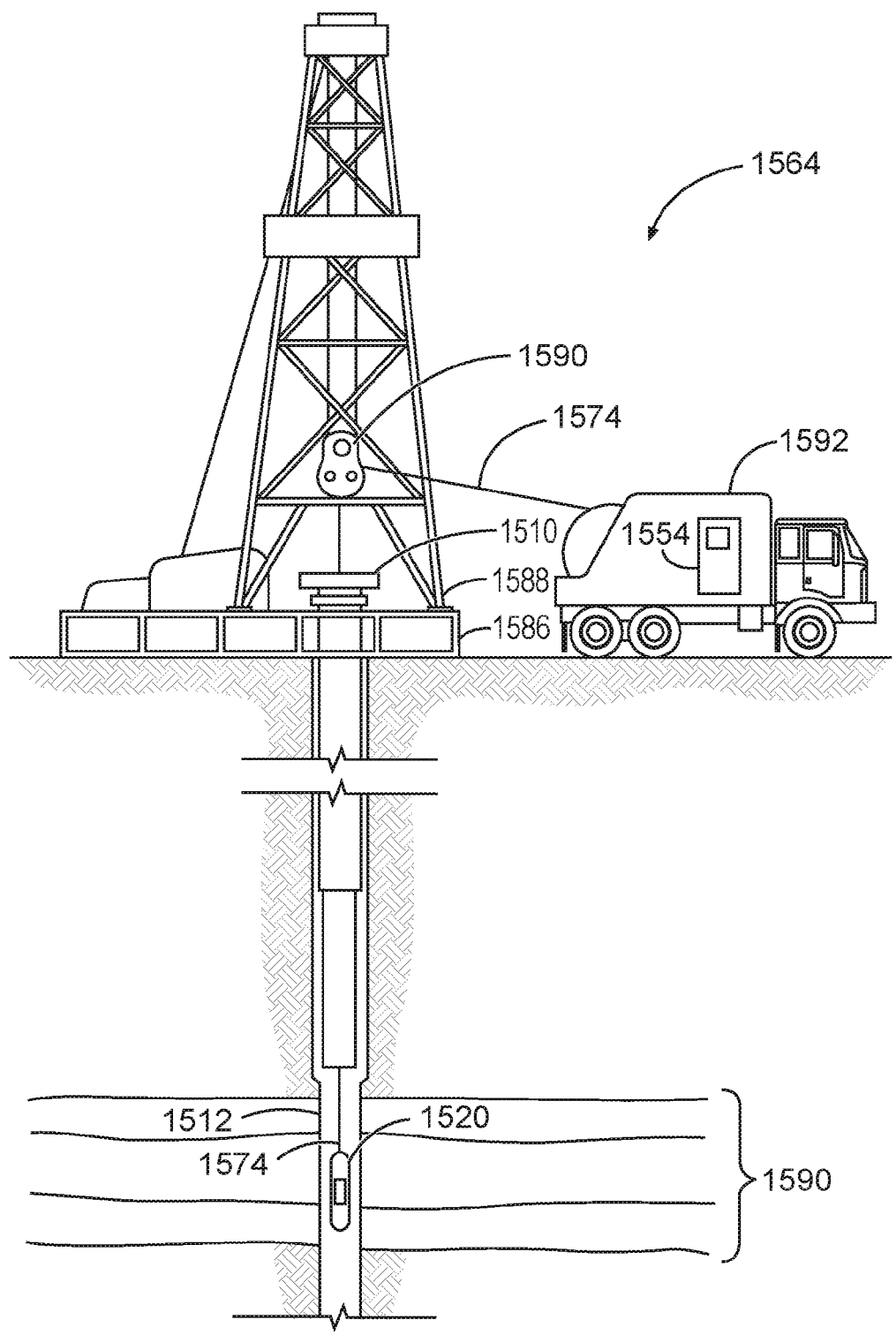
FIG. 15 is a diagram showing an example wireline system, according to various embodiments.

FIG. 15 is a diagram showing an example wireline system, according to various embodiments. In this case, a drilling platform 1586 is equipped with a derrick 1588 that supports a hoist 1590.

Drilling oil and gas wells is commonly carried out using a string of drill pipes connected together so as to form a drillstring that is lowered through a rotary table 1510 into a wellbore or borehole 1512. Here it is assumed that the drillstring has been temporarily removed from the borehole 1512 to allow a wireline logging tool 1520, such as a probe or sonde, to be lowered by wireline or logging cable 1574 (e.g., slickline cable) into the borehole 1512. Typically, the wireline logging tool 1520 is lowered to the bottom of the region of interest and subsequently pulled upward at a substantially constant speed. The wireline logging tool 1520 may include a multi-array induction sensor tool for performing measurements discussed herein.

During the upward trip, at a series of depths, various instruments may be used to perform measurements on the subsurface geological formations 1514 adjacent to the borehole 1512 (and the tool body 1520). The wireline data may be communicated to a surface logging facility 1592 for processing, analysis, and/or storage. The logging facility 1592 may be provided with electronic equipment, such as a controller 1554, for various types of signal processing.

Figure 16:
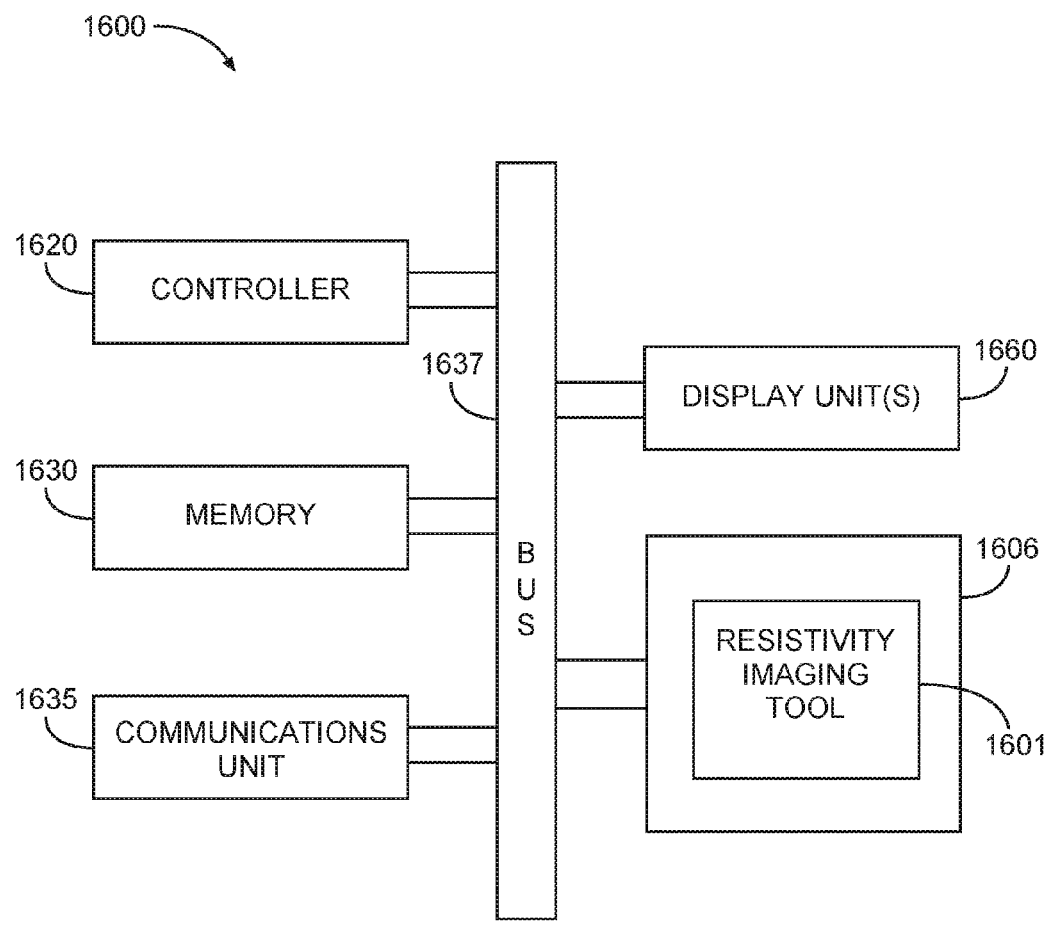
FIG. 16 is a block diagram of an example system operable to execute the methods herein, according to various embodiments.

FIG. 16 is a block diagram of an example system 1600 operable to implement the activities of multiple methods, according to various examples of the disclosure. The system 1600 may include a tool housing 1606 having the downhole tool (e.g., multi-array induction sensor tool) 1601 disposed therein. The system 1600 may be implemented as shown in FIG. 15 with reference to the workstation 1592 and controller 1554.

The system 1600 may include a controller 1620, a memory 1630, and a communications unit 1635. The memory 1630 may be structured to include a database. The controller 1620, the memory 1630, and the communications unit 1635 may be arranged to operate as control circuitry to control operation of the downhole tool 1601 and execute any methods disclosed herein in order to perform downhole measurements and reduce the borehole corkscrew effect in the measurements.

The communications unit 1635 may include communications capability for communicating from downhole to the surface or from the surface to downhole. Such communications capability can include a telemetry system such as mud pulse telemetry. In another example, the communications unit 1635 may use combinations of wired communication technologies and wireless technologies.

The system 1600 may also include a bus 1637 that provides electrical conductivity among the components of the system 1600. The bus 1637 can include an address bus, a data bus, and a control bus, each independently configured or in an integrated format. The bus 1637 may be realized using a number of different communication mediums that allows for the distribution of components of the system 1600. The bus 1637 may include a network. Use of the bus 1637 may be regulated by the controller 1620.

The system 1600 may include display unit(s) 1660 as a distributed component on the surface of a wellbore, which may be used with instructions stored in the memory 1630 to implement a user interface to monitor the operation of the tool 1606 or components distributed within the system 1600.

These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Many embodiments may be realized. Several examples will now be described.

Example 1 is a method for reducing borehole corkscrew effect on array induction tool measurements, the method comprising: defining a zone in a borehole unaffected by the corkscrew effect and a zone in the borehole affected by the corkscrew effect; averaging caliper data of the borehole for the zone in the borehole affected by the corkscrew effect; and updating previously measured formation resistivities based on the average caliper data.

In Example 2, the subject matter of Example 1 can further include wherein updating the previously measured formation resistivities comprises updating the previously measured formation resistivities based on the average caliper data, apparent conductivity, skin effect correction, and borehole correction.

In Example 3, the subject matter of Examples 1-2 can further include wherein the updating the previously measured resistivities further comprises generating a table comprising the average caliper data, the apparent conductivity, the skin effect correction, and the borehole correction for each array of a multiple array tool.

In Example 4, the subject matter of Examples 1-3 can further include wherein defining the zone in the borehole affected by the corkscrew effect comprises defining a start depth and an end depth of a portion of the borehole affected by the corkscrew effect.

In Example 5, the subject matter of Examples 1-4 can further include measuring the caliper data of the borehole using a mechanical or sonic tool to log borehole diameter readings of the borehole.

In Example 6, the subject matter of Examples 1-5 can further include generating a reference table of mud resistivity, caliper data, conductivity, skin effect correction, and borehole correction for the zone in the borehole unaffected by the corkscrew effect.

In Example 7, the subject matter of Examples 1-6 can further include wherein generating the reference table comprises generating the reference table for each array of a multiple array tool as a reference table for the zone in the borehole unaffected by the corkscrew effect.

In Example 8, the subject matter of Examples 1-7 can further include determining a time to reach a predetermined depth in a borehole and a logging speed; determining calibration values for caliper data in response to the average caliper data; determining temperature coefficients; determine skin effect parameters; generating a calibration application based on the calibration values and temperature correction based on the temperature coefficients; performing a depth alignment; determining a skin effect correction based on the skin effect parameters; and performing a borehole drilling correction in a geological formation based on the skin effect correction, the temperature coefficients, the depth alignment, and the calibration values.

In Example 9, the subject matter of Examples 1-8 can further include, prior to determining the calibration values for caliper data, determining raw coil signals from tool arrays deeper in the borehole.

Example 10 is a non-transitory computer readable medium that stores instructions for execution by processing circuitry to perform operations for borehole corkscrew effect reduction on tool measurements in a borehole, the operations: measure caliper data of the borehole; define an unaffected zone of the borehole substantially unaffected by borehole corkscrew effect; define an affected zone of the borehole affected by the borehole corkscrew effect; average the caliper data corresponding to the affected zone; and update previously measured resistivities based on at least one of the average caliper data, apparent conductivity, skin effect correction, or borehole correction.

In Example 11, the subject matter of Example 10 can further include wherein updated previously measured resistivities comprise one foot vertical resolution resistivities ($R_O$), two foot vertical resolution resistivities ($R_t$), and four foot vertical resolution resistivities ($R_f$).

In Example 12, the subject matter of Examples 10-11 can further include generate a table having temperature corrected mud resistivity ($R_m$), average caliper data, updated apparent conductivities ($\sigma_{app}$) for each of a plurality of coil arrays based on the average caliper data, skin effect correction, and borehole correction for the plurality of coil arrays.

In Example 13, the subject matter of Examples 10-12 can further include determine the updated apparent conductivities for the plurality of coil arrays comprising 6 inch, 10 inch and 17 inch coil arrays.

In Example 14, the subject matter of Examples 10-13 can further include execute a re-log process with the updated apparent conductivities for the plurality of coil arrays; and determine the updated $R_O$, $R_t$, and $R_f$ resistivities based on the table.

Example 15 is a system comprising: a wireline tool having a sensor tool; and control circuitry, the circuitry configured to reduce a borehole corkscrew effect on array induction measurements in a borehole, the circuitry configured to define a zone in the borehole unaffected by the corkscrew effect and a zone in the borehole affected by the corkscrew effect, average caliper data of the borehole for the zone in the borehole affected by the corkscrew effect, and update previously measured formation resistivities based on the average caliper data.

In Example 16, the subject matter of Example 15 can further include wherein the updated resolution outputs comprise different vertical resolutions.

In Example 17, the subject matter of Examples 15-16 can further include wherein the circuitry is further configured to generate a reference look-up table for mud resistivity, caliper, σ for each coil array of the sensor tool, skin effect, and borehole correction.

In Example 18, the subject matter of Examples 15-17 can further include wherein the circuitry is further configured to generate a temperature corrected look-up table based on the reference look-up table and temperature coefficients.

In Example 19, the subject matter of Examples 15-18 can further include wherein the circuitry is further configured to generate the temperature corrected look-up table for each array of the sensor tool.

In Example 20, the subject matter of Examples 15-19 can further include wherein the circuitry is further configured to control the further drilling of the borehole based on a re-log process with newly obtained σapp, apparent conductivities for a plurality of array coils based on the average caliper data and the updated resolution outputs.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for reducing a corkscrew effect on array induction tool measurements of a borehole, the method comprising:
    drilling the borehole based on initial formation resistivities;
    displacing an array induction tool through the borehole to collect the array induction tool measurements, which comprise formation resistivities along the borehole;
    measuring caliper data of the borehole, wherein the caliper data represents a measured diameter of the borehole along the borehole's depth;
    detecting oscillations in a first portion of the caliper data that start at a first depth and end at a second depth, wherein the first and second depths define an affected zone in the borehole that is affected by the corkscrew effect;
    detecting a second portion of the caliper data unaffected by the corkscrew effect, wherein the second portion corresponds to an unaffected zone in the borehole;
    averaging the caliper data of the borehole for the affected zone to produce average caliper data for the affected zone;
    calibrating the formation resistivities for the affected zone based on the average caliper data; and
    drilling the borehole further based on the calibrated formation resistivities.

2. The method of claim 1, wherein the calibrating further comprises calibrating the formation resistivities based on the average caliper data, an apparent conductivity, a skin effect correction, and a borehole correction.

3. The method of claim 2, wherein the calibrating further comprises generating a table comprising the average caliper data, the apparent conductivity, the skin effect correction, and the borehole correction for each array of a multiple array tool.

4. The method of claim 1, wherein the measuring further comprises measuring the caliper data of the borehole using the array induction tool to log borehole diameter readings of the borehole.

5. The method of claim 1, wherein the measuring further comprises measuring the caliper data of the borehole using a mechanical or sonic tool to log borehole diameter readings of the borehole.

6. The method of claim 1, further comprising generating a reference table of mud resistivity, caliper data, conductivity, skin effect correction, and borehole correction for the unaffected zone.

7. The method of claim 6, wherein generating the reference table comprises generating the reference table for each array of a multiple array tool as a reference table for the unaffected zone.

8. The method of claim 1 and further comprising:
determining a time to reach a predetermined depth in a borehole and a logging speed;
determining calibration values for caliper data in response to the average caliper data;
determining temperature coefficients;
determining skin effect parameters;
generating a calibration application based on the calibration values and a temperature correction based on the temperature coefficients;
performing a depth alignment;
determining a skin effect correction based on the skin effect parameters; and
performing a borehole drilling correction in a geological formation based on the skin effect correction, the temperature coefficients, the depth alignment, and the calibration values.

9. The method of claim 8, further comprising, prior to determining the calibration values for caliper data, determining raw coil signals from tool arrays deeper in the borehole.

10. A non-transitory computer readable medium that stores instructions for execution by processing circuitry to perform operations for borehole corkscrew effect reduction on tool measurements in a borehole, the operations:
drill the borehole based on initial formation resistivities;
measure caliper data of the borehole, wherein the caliper data represents a measured diameter of the borehole along the borehole's depth;
measure formation resistivities along the borehole via displacement of an array induction tool along the borehole;
detect oscillations in a first portion of the caliper data that start at a first depth and end at a second depth, wherein the first and second depths define an affected zone in the borehole that is affected by the corkscrew effect;
detect a second portion of the caliper data unaffected by the corkscrew effect, wherein the second portion corresponds to an unaffected zone in the borehole;
average the caliper data corresponding to the affected zone to produce average caliper data;
update the formation resistivities based on at least one of the average caliper data, an apparent conductivity, a skin effect correction, or a borehole correction;
adjust drilling parameters based on the updated formation resistivities; and
drill the borehole further based on the adjusted drilling parameters.

11. A non-transitory computer readable medium that stores instructions for execution by processing circuitry to perform operations for borehole corkscrew effect reduction on tool measurements in a borehole, the operations:
drill the borehole based on initial formation resistivities;
measure caliper data of the borehole, wherein the caliper data represents a measured diameter of the borehole along the borehole's depth;
measure formation resistivities along the borehole via displacement of an array induction tool along the borehole;
detect oscillations in a first portion of the caliper data that start at a first depth and end at a second depth, wherein the first and second depths define an affected zone in the borehole that is affected by the corkscrew effect;
detect a second portion of the caliper data unaffected by the corkscrew effect, wherein the second portion corresponds to an unaffected zone in the borehole;
average the caliper data corresponding to the affected zone to produce average caliper data;
update the formation resistivities based on at least one of the average caliper data, an apparent conductivity, a skin effect correction, or a borehole correction, wherein the updated formation resistivities comprise one foot vertical resolution resistivities ($R_o$), two foot vertical resolution resistivities ($R_t$), and four foot vertical resolution resistivities ($R_f$);
adjust drilling parameters based on the updated formation resistivities; and
drill the borehole further based on the adjusted drilling parameters.

12. The non-transitory computer readable medium of claim 10, the operations further:
generate a table having temperature corrected mud resistivity ($R_m$), average caliper data, and updated apparent conductivities ($\sigma_{app}$) for each of a plurality of coil arrays based on the average caliper data, a skin effect correction, and a borehole correction for the plurality of coil arrays.

13. The non-transitory computer readable medium of claim 12, the operations further:
determine the updated apparent conductivities for the plurality of coil arrays comprising 6 inch, 10 inch and 17 inch coil arrays.

14. The non-transitory computer readable medium of claim 12, the operations further:
execute a re-log process with the updated apparent conductivities for the plurality of coil arrays; and
determine updated $R_o$, $R_t$, and $R_f$ resistivities based on the table.

15. A system comprising:
a wireline tool having an induction array sensor tool; and
control circuitry, the circuitry configured to reduce a borehole corkscrew effect on array induction measurements in a borehole based on caliper data collected along the borehole, wherein the caliper data represents a measured diameter of the borehole along the borehole's depth,
the circuitry configured to detect oscillations in a first portion of the caliper data that start at a first depth and end at a second depth, wherein the first and second depths define an affected zone in the borehole that is affected by the corkscrew effect, and to detect a second portion of the caliper data unaffected by the corkscrew effect, wherein the second portion corresponds to an unaffected zone in the borehole;

average the caliper data of the borehole for the affected zone to produce average caliper data, measure formation resistivities along the borehole via the induction array sensor;

calibrate the formation resistivities associated with the affected zone based on the average caliper data;

adjust drilling parameters based on the calibrated formation resistivities; and drill the borehole further based on the adjusted drilling parameters.

16. The system of claim 15, wherein the calibrated formation resistivities comprise different vertical resolutions.

17. The system of claim 15, wherein the circuitry is further configured to generate a reference look-up table for mud resistivity, the caliper data, a $\sigma$ for each coil array of the sensor tool, a skin effect, and a borehole correction.

18. The system of claim 15, wherein the circuitry is further configured to generate a temperature corrected look-up table based on the reference look-up table and temperature coefficients.

19. The system of claim 18, wherein the circuitry is further configured to generate the temperature corrected look-up table for each array of the sensor tool.

20. The system of claim 15, wherein the circuitry is further configured to control the further drilling of the borehole based on a re-log process with newly obtained $\sigma_{app}$, apparent conductivities for a plurality of array coils based on the average caliper data and the calibrated formation resistivities.

21. The method of claim 1 and further comprising drilling the borehole with a drill string that comprises a drill bit and a bottom hole assembly (BHA), the BHA having an overall length equal to a first length, wherein the oscillations have a length.

* * * * *

UNITED STATES PATENT AND TRADEMARK OFFICE
CERTIFICATE OF CORRECTION

PATENT NO. : 9,798,036 B2
APPLICATION NO. : 15/039953
DATED : October 24, 2017
INVENTOR(S) : Ameet B. Agnihotri et al.

It is certified that error appears in the above-identified patent and that said Letters Patent is hereby corrected as shown below:

In the Specification

Column 1, Line 11: replace "there" with --their--;

In the Claims

Column 12, Line 18: In Claim 21, before "length", please insert --pitch that is equal to the first--.

Signed and Sealed this
Twentieth Day of February, 2018

Andrei Iancu
*Director of the United States Patent and Trademark Office*